US011921232B2

(12) United States Patent
Vianello et al.

(10) Patent No.: US 11,921,232 B2
(45) Date of Patent: Mar. 5, 2024

(54) VEHICLE SERVICE SYSTEM AND OPERATING METHOD THEREOF

(71) Applicant: TEXA S.P.A., Monastier di Treviso (IT)

(72) Inventors: Bruno Vianello, Monastier di Treviso (IT); Leonardo Polito, Monastier di Treviso (IT)

(73) Assignee: TEXA S.P.A., Monastier di Treviso (IT)

( * ) Notice: Subject to any disclaimer, the term of this patent is extended or adjusted under 35 U.S.C. 154(b) by 0 days.

(21) Appl. No.: 17/679,669

(22) Filed: Feb. 24, 2022

(65) Prior Publication Data
US 2022/0268885 A1    Aug. 25, 2022

(30) Foreign Application Priority Data

Feb. 25, 2021   (IT) .......................... 102021000004388

(51) Int. Cl.
*G01S 7/40*        (2006.01)
*G01S 13/931*     (2020.01)
(Continued)

(52) U.S. Cl.
CPC .............. *G01S 7/40* (2013.01); *G01S 13/931* (2013.01); *G06T 7/73* (2017.01); *G06T 7/80* (2017.01);
(Continued)

(58) Field of Classification Search
CPC . G01S 7/40; G01S 13/931; G06T 7/80; G06T 7/73; G06T 2207/30252;
(Continued)

(56) References Cited

U.S. PATENT DOCUMENTS

2005/0096807 A1    5/2005   Murray
2013/0325252 A1   12/2013   Schommer
(Continued)

FOREIGN PATENT DOCUMENTS

EP       3-629-053 A1 *  5/2019
EP       3629053 A1       4/2020
(Continued)

OTHER PUBLICATIONS

Extended European Search Report in EP Application No. 22158905. 4-1001, dated Jul. 8, 2022 (9 pages).

*Primary Examiner* — Zaihan Jiang
(74) *Attorney, Agent, or Firm* — Leason Ellis LLP

(57) ABSTRACT

A vehicle service system comprising a calibration apparatus, which is designed to calibrate an ADAS sensor of a vehicle, a calibration device and a position detection system, which comprises, in turn, two optical apparatuses, which are arranged on opposite sides of the vehicle and are configured to capture first images containing images of the vehicle. The optical apparatuses have respective positioning targets, which are oriented so as to face the calibration apparatus. The position detection system further comprises two cameras, which are mounted on the calibration apparatus so as to be arranged in lateral positions on opposite sides with respect to the calibration device. The two cameras are optically oriented towards the optical apparatuses so as to capture the images of the positioning targets.

15 Claims, 5 Drawing Sheets

(51) Int. Cl.
  *G06T 7/73* (2017.01)
  *G06T 7/80* (2017.01)
  *H04N 5/232* (2006.01)
  *H04N 5/247* (2006.01)
  *H04N 13/239* (2018.01)
  *H04N 23/695* (2023.01)
  *H04N 23/90* (2023.01)
  *B60W 50/00* (2006.01)

(52) U.S. Cl.
  CPC ......... *H04N 13/239* (2018.05); *H04N 23/695* (2023.01); *H04N 23/90* (2023.01); *B60W 50/00* (2013.01); *B60W 2050/0083* (2013.01); *G06T 2207/30252* (2013.01)

(58) Field of Classification Search
  CPC .... H04N 13/239; H04N 23/695; H04N 23/90; B60W 50/00; B60W 2050/0083
  See application file for complete search history.

(56) References Cited

U.S. PATENT DOCUMENTS

| | | | |
|---|---|---|---|
| 2014/0111645 A1* | 4/2014 | Shylanski | G06T 7/97 348/148 |
| 2020/0348129 A1 | 11/2020 | Deboer | |
| 2021/0209794 A1* | 7/2021 | Cejka | F16M 11/123 |
| 2021/0278203 A1* | 9/2021 | Corghi | G01B 11/2755 |
| 2022/0015004 A1* | 1/2022 | Nakano | B60R 11/02 |
| 2022/0390226 A1* | 12/2022 | Boncek | G01B 11/2755 |

FOREIGN PATENT DOCUMENTS

| | | |
|---|---|---|
| WO | 2018067354 A1 | 4/2018 |
| WO | 2019/025062 A1 | 2/2019 |
| WO | 2021/024286 A1 | 2/2021 |

\* cited by examiner

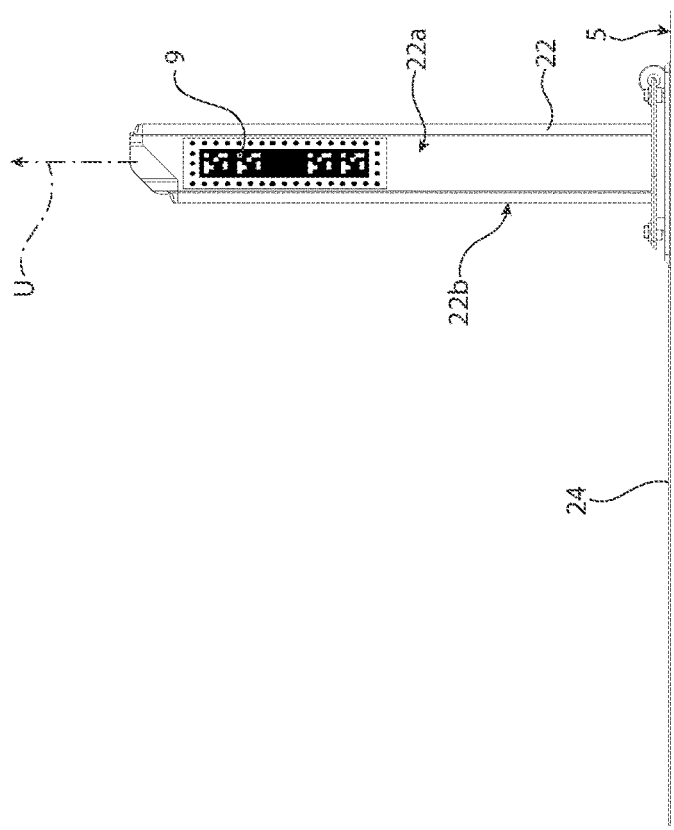
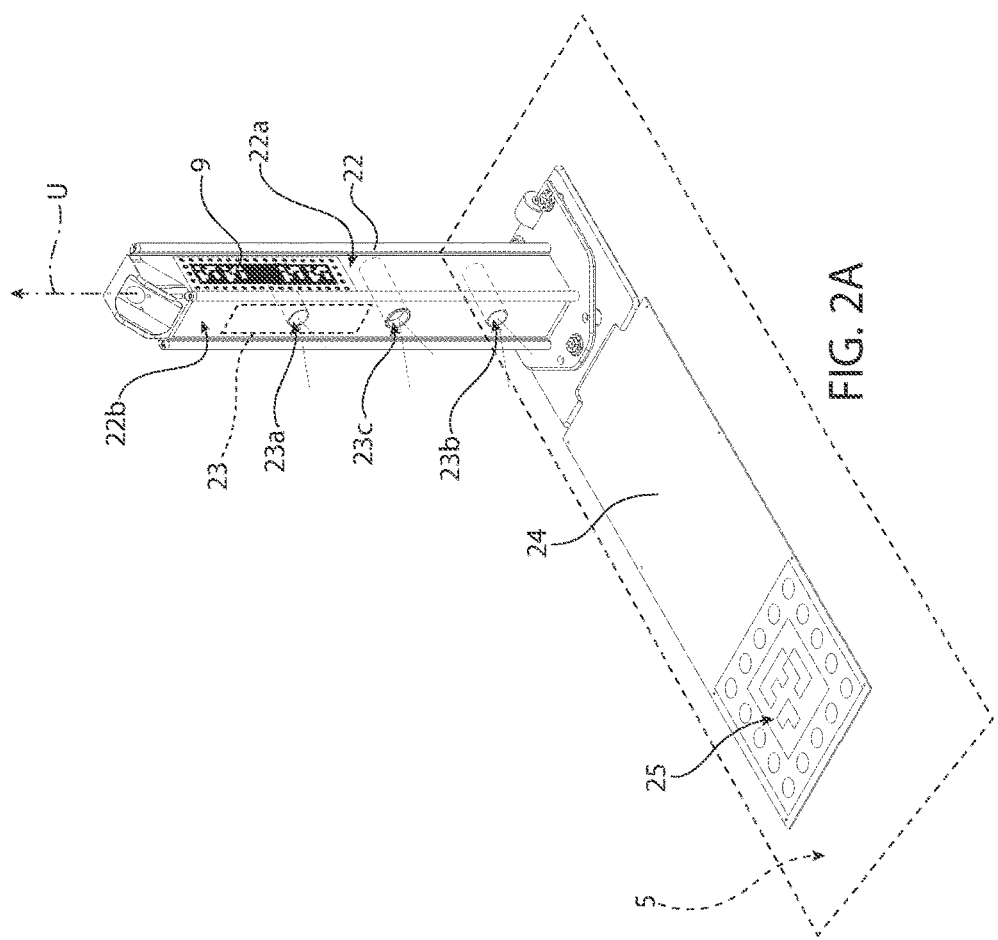

VEHICLE SERVICE SYSTEM AND OPERATING METHOD THEREOF

CROSS-REFERENCE TO RELATED APPLICATIONS

This patent application claims priority from Italian patent application no. 102021000004388 filed on Feb. 25, 2021, the entire disclosure of which is incorporated herein by reference.

TECHNICAL FIELD

The invention relates to the calibration and/or the alignment of ADAS sensors of an advanced driver assistance system of a vehicle.

PRIOR ART

As it is known, last-generation vehicles are provided with advanced driver assistance systems, hereinafter referred to as ADAS systems. ADAS systems are generally provided with electronic sensor devices, such as radar sensors and optical sensors (cameras), hereinafter referred to a ADAS sensors, mounted on board the vehicle. ADAS systems are further provided with processing systems, which treat the information provided by the ADAS sensors in order to implement assistance functions that help drivers while driving so as to increase their safety.

In order to re-align/re-calibrate the aforesaid ADAS sensors, for example following a crash of the vehicle, vehicle service system are further used, which are provided with an ADAS calibration apparatus.

The ADAS calibration apparatus is generally provided with a vertical support structure, on which two target panels are mounted, which are structured so as to facilitate the calibration of the ADAS sensors.

The calibration process entails, among different steps, an initial positioning step to position the ADAS calibration apparatus and the target panels in a predetermined calibration position with respect to the vehicle.

The aforesaid calibration position is generally determined based on a series of calibration conditions, which are defined by the vehicle manufacturer and commonly correspond to a pre-established distance and orientation of the ADAS calibration apparatus and of the target panel with respect to a known point of the vehicle.

An imprecise positioning of the ADAS calibration apparatus and/or of the target panels with respect to the provisions of the calibration conditions significantly affects the final result of the calibration of the ADAS sensor and can lead to significant errors that jeopardise the correct operation of the ADAS system.

In some vehicle service system, the aforesaid positioning is manually carried out by an operator. This solution is subjected to a high risk of errors, since it basically depends on the precision and on the expertise of the operator carrying out the positioning operation.

In order to overcome this drawback systems were conceived, such as for example the ones described in U.S. Pat. No. 7,382,913 B1 and EP 3 686 551 A1, which facilitate the positioning of the ADAS calibration apparatus in front of the vehicle.

However, these systems, even though—on the one hand—they increased the level of positioning precision, on the other hand do not completely ensure the required degree of accuracy.

Therefore, a different vehicle service system is needed, which is versatile, simple, ensures high performances and is capable of determining, with utmost precision, the position of the ADAS calibration apparatus and/or of the target panel with respect to the vehicle.

Furthermore, the solution described in EP3629053A1 is known, which discloses a system comprising an ADAS calibration apparatus arranged in front of the vehicle and two optical devices arranged on the side of the vehicle. The system further comprises two association cameras, which are arranged on the two optical devices and are oriented so as to observe two targets mounted on the ADAS calibration device.

Furthermore, the solutions described in US 2013/325252A1 and WO2019/025062A1 are known, wherein the system comprises an ADAS calibration apparatus provided with two lateral targets, two wheel targets mounted on the rear wheels of the vehicle and two measuring devices, which are arranged on the side of the vehicle and are each provided with two front cameras observing the relative target mounted on the ADAS calibration apparatus and with two rear cameras observing the relative wheel target.

DESCRIPTION OF THE INVENTION

The object of the invention is to provide a vehicle service system provided with a calibration apparatus for an ADAS sensor of a vehicle, which meets the aforesaid needs.

In accordance with this object, according to the invention, there are provided a vehicle service system and an operating method thereof, as defined in the relative independent claims and preferably, though not necessarily, in any one of the claims depending on them.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein:

FIG. 2A is a perspective view, on a larger scale, of an optical apparatus of the vehicle service system shown in FIG. 1, FIG. 2B is a lateral elevation view, on a larger scale, of an optical apparatus of the vehicle service system shown in FIG. 1.

PREFERRED EMBODIMENTS OF THE INVENTION

Figure 1:
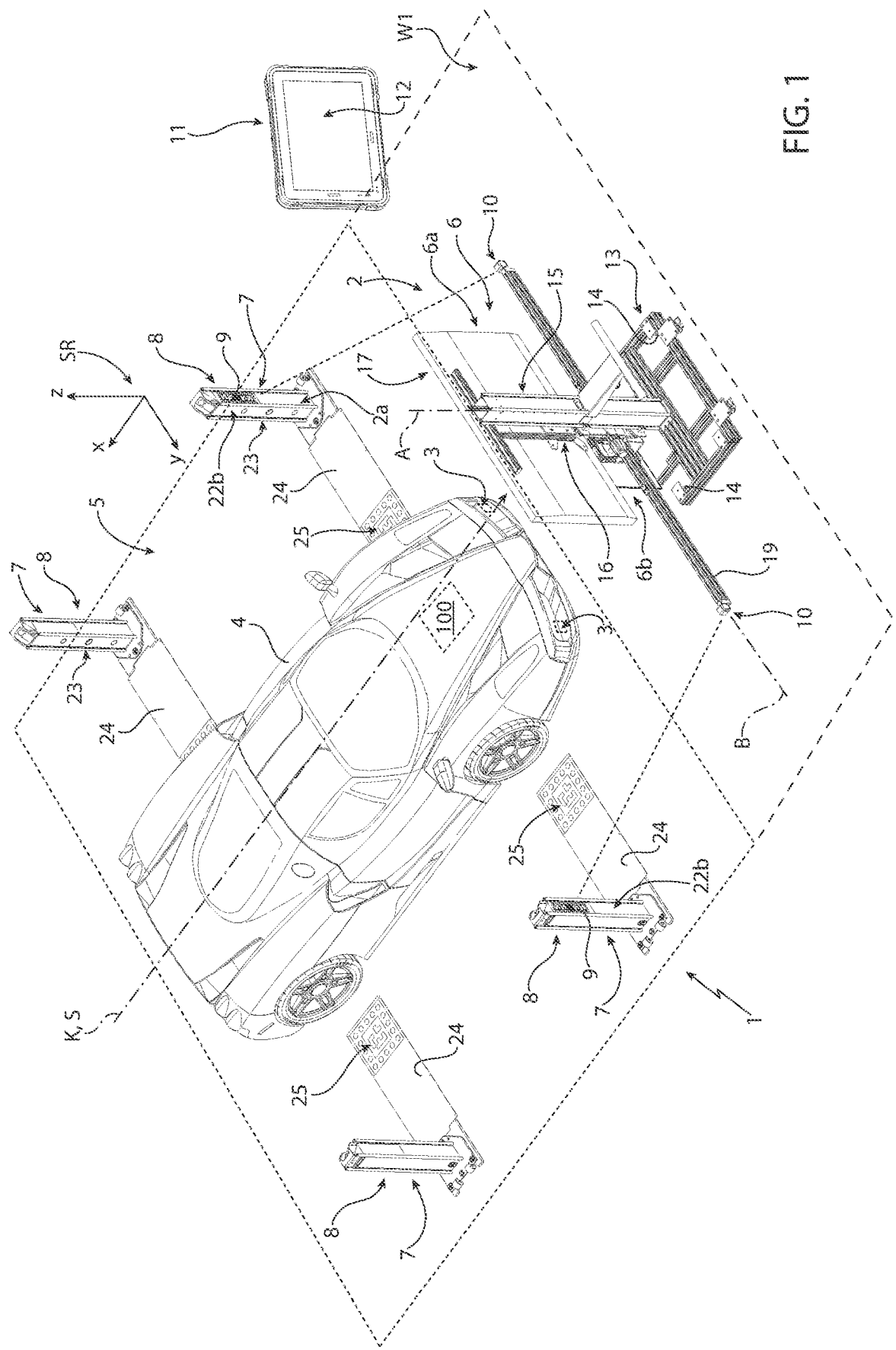
FIG. 1 is a schematic perspective view of a vehicle service system according to the invention.
Figure 3:
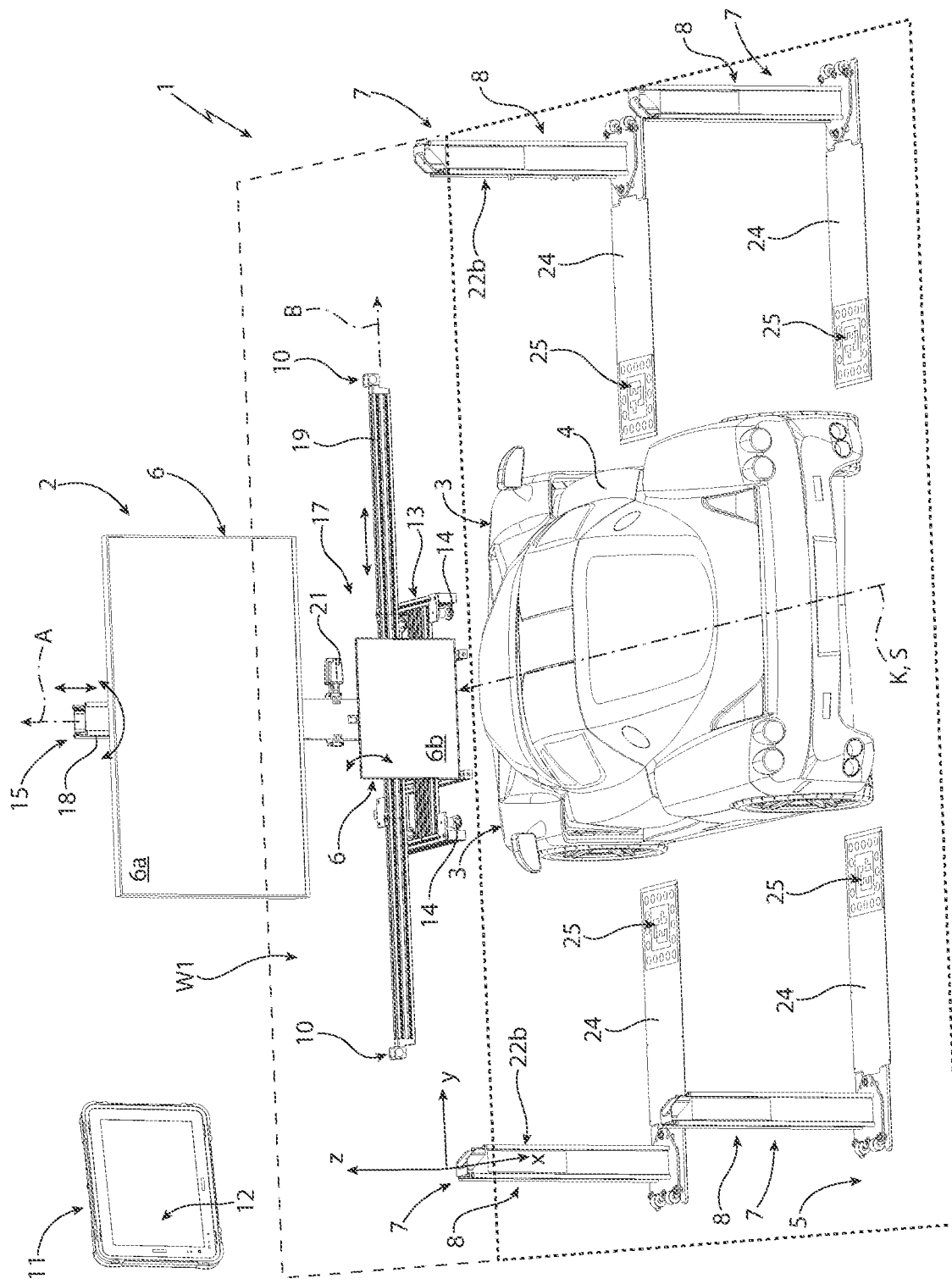
FIG. 3 is a schematic perspective view of the vehicle service system according to the invention, according to an orientation that is different from the one of FIG. 1.

With reference to FIGS. 1 and 3, number 1 indicates, as a whole, a vehicle service system comprising a calibration apparatus 2, which is designed to calibrate the electronic sensor devices, hereinafter indicated with ADAS sensors 3, comprised in an advanced driver assistance system (ADAS)

100 of a vehicle 4 arranged in a service area 5. In the example shown herein, the service area 5 has an axis K.

The ADAS sensor 3 can comprise any sensor of the advanced driver assistance system 100. For example, the ADAS sensor 3 can comprise: a radar sensor, an optical sensor, a camera, a LIDAR sensor, an ultrasound sensor, an infrared (IR) sensor or any other similar sensor.

Obviously, according to this description, the "calibration" (and/or re-calibration) function carried out by the calibration apparatus 2 includes, in addition and/or alternatively, an "alignment" (or re-alignment) function for an ADAS sensor 3.

With reference to FIGS. 1 and 3, the calibration apparatus 2 is designed to move (and/or be moved) on a resting surface W1 adjacent (for example, horizontal and coplanar) to the vehicle service area 5 so as to face the vehicle 4.

The calibration apparatus 2 comprises one or more calibration devices 6, which are designed to be detected by the relative ADAS sensors 3 of the vehicle 4 during their calibration process.

According to the invention, the vehicle service system 1 further comprises a position detection system 7, which comprises optical apparatuses 8. According to an explanatory embodiment shown in FIGS. 1 and 3, the position detection system 7 comprises four optical apparatuses 8. The optical apparatuses 8 are arranged in the service area 5 in such a way that each pair is opposite the other pair with respect to the longitudinal axis S of the vehicle 4 (or to the axis K of the service area 5). The axis S of the vehicle 4 can correspond to the symmetry axis or to the thrust axis of the vehicle. The optical apparatuses 8 are configured to capture first images containing lateral images of the vehicle 4.

According to the invention, the optical apparatuses 2 have respective positioning targets 9, which are oriented so as to face the calibration apparatus 2. According to a possible embodiment, the position detection system 7 comprises four optical apparatuses 8 and four positioning targets 9, each of which is associated with/firmly fixed on the relative optical apparatus 8 (in the way described in detail below) and is oriented so as to face (be directed towards) the calibration apparatus 2. According to the invention, the vehicle service system 1 further comprises two video cameras 10 (or cameras or the like), which are mounted in/on the calibration apparatus 2 so as to be arranged in lateral positions on opposite sides with the respect to the calibration device/s 6.

According to the invention, the two cameras 10 are oriented/directed towards the respective optical apparatuses 8 and are designed to capture/acquire second images, which contain the positioning targets 9 present on the respective optical apparatuses 8.

According to a possible embodiment, in which the position detection system 7 comprises four optical apparatuses 8 and four positioning targets 9, the two cameras 10 are mounted in/on the calibration apparatus 2 so as to be oriented/directed towards the four optical apparatuses 8 in order to capture/acquire the second images, which contain the respective four positioning targets 9 of the four optical apparatuses 8.

According to the invention, the vehicle service system 1 further comprises an electronic control system 11 (schematically indicated in the accompanying figures), which is configured so as to determine a first position, which is indicative of the position of the calibration apparatus 2 and/or of the position of the calibration devices 6 (and/or of the calibration assistance assembly 17 described in detail below) with respect to the vehicle 4, based on the first images and the second images.

Conveniently, the electronic control system 11 is further configured so as to guide the positioning of the calibration apparatus 2 and/or of the calibration devices 6 (and/or of the calibration assistance assembly 17 described in detail below) in a pre-established calibration position based on the determined first position.

Conveniently, according to the invention, the electronic control system 11 can further be configured so as to provide a user, by means of a user interface device 12, with information to assist/guide the positioning, namely the movement of the calibration apparatus 2 and/or the handling of the calibration device 6 (and/or of the calibration assistance assembly 17 described in detail below) in/to the pre-established calibration position based on the determined first position.

According to a preferred embodiment of the invention shown in FIGS. 1-4, the calibration apparatus 2 comprises a base 13, which is designed to move on a resting plane W1. The base 13 can be designed to be moved by means of a manual push. To this regard, the base 13 is movable and can be provided, at the bottom, with support wheels 14. The wheels 14 can be, for example, cylindrical wheels and/or spherical wheels pivoting around a plurality of axes in order to allow the base 13 to freely move on the resting plane W1 in any horizontal direction. Alternatively or in addition, the base 13 can be designed to move in an autonomous manner (automatically) and be provided with motorised wheels, which are caused to rotate by motorised eclectic units (not shown herein) and are designed to be oriented, on command, by means of electronic/electromechanical guide members, which control the direction thereof.

According to a preferred explanatory embodiment shown in FIGS. 1-4, the calibration apparatus 2 comprises a support frame 15. The support frame 15 is preferably coupled/connected to the base 13 and extends above the latter.

Figure 4:
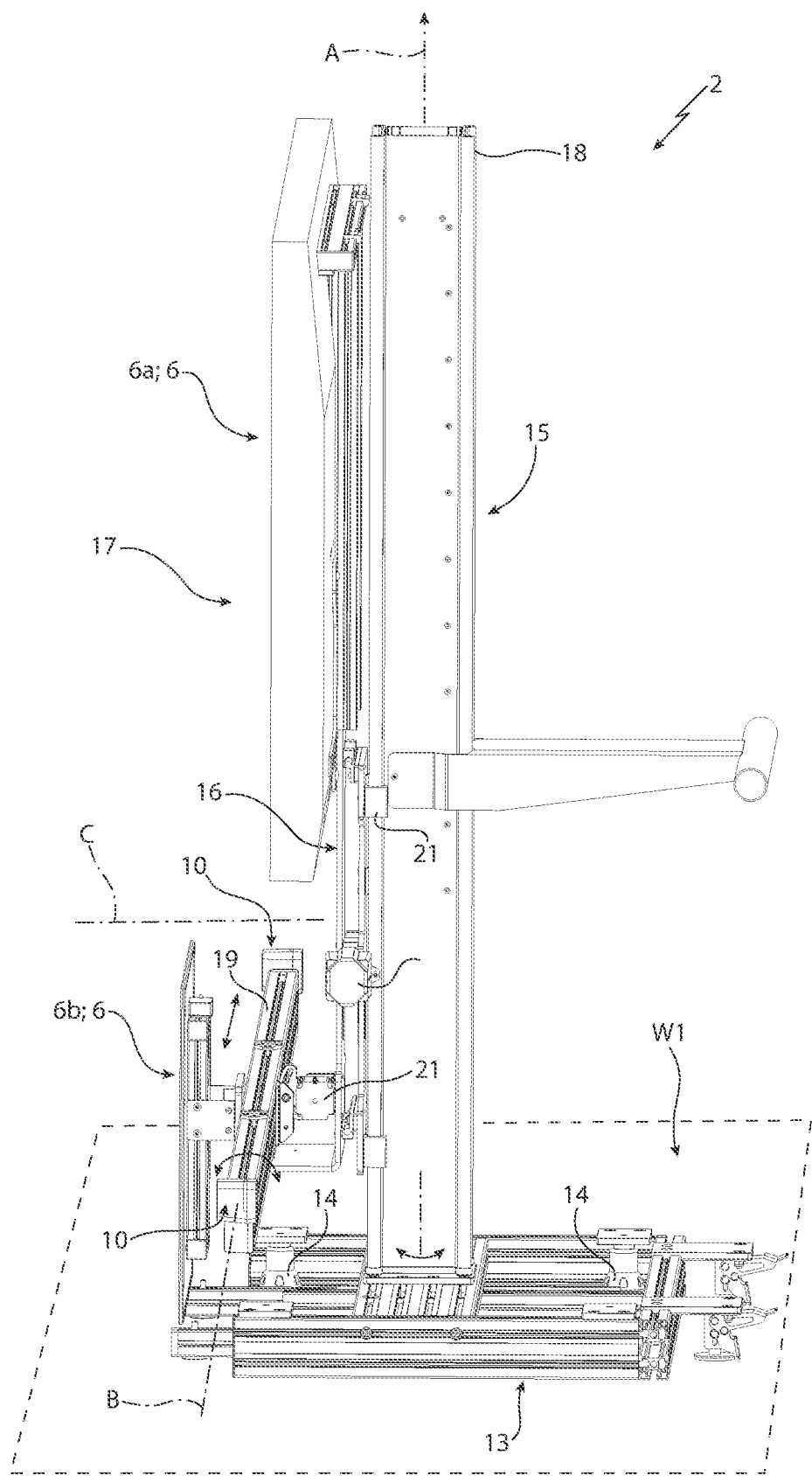
FIG. 4 is a lateral elevation view, on a larger scale, of the calibration apparatus of the vehicle service system shown in FIG. 1.

According to a preferred explanatory embodiment shown in FIG. 4, the calibration apparatus 2 further comprises a support frame 16, which is coupled to the support frame 15 and supports the calibration devices 6 and the cameras 10. The support frame 16, the calibration devices 6 and the cameras 10 form a calibration assistance assembly 17.

According to a preferred explanatory embodiment shown in FIG. 4, the support frame 16 is provided (at the bottom) with a straight rod or bar 19, which extends approximately horizontally. The cameras 10 are firmly arranged at the two opposite free ends of the straight bar 19 and are oriented so that they can observe the respective positioning targets 9. The cameras 10 are firmly arranged at the two opposite free ends of the straight bar 19 and are oriented so that they can capture the images of the positioning targets 9 present on the optical apparatuses 8.

The support frame 15 can comprise a column 18, which extends along an approximately vertical axis A. The column 18 can be mounted on the base 13 so that it can rotate around the axis A. The rotation of the column 18 relative to the base 13 determines the rotation of the calibration assistance assembly 17 around the axis A. The rotation of the calibration assistance assembly 17 around the axis A determines a corresponding change in the angle present between the flat ADAS calibration surfaces associated with the respective calibration devices 6 and the axis S of the vehicle 4.

The support frame 16 can be coupled to the support frame 15 in an easily removable (separable) manner. The support frame 16 can be (mechanically) coupled to the support frame 15 so as to move along the axis A (in a vertical manner) from and to the base 13 arranged underneath. The movement of the support frame 16 along the axis A from and to the base 13 determines a change in the height of the calibration assistance assembly 17 (measured vertically with respect to the vehicle 4 or the resting plane). The support frame 16 can further be (mechanically) coupled to the support frame 15 so as to move along a horizontal axis B (which is orthogonal to the axis A). The movement of the support frame 16 along the axis B determines the horizontal movement of the calibration assistance assembly 17 (with respect to the base 13).

The support frame 16 can further be (mechanically) coupled to the support frame 15 so as to move along a horizontal axis C (FIG. 4), which is orthogonal to the axis A and B, in order to move the calibration assistance assembly 17 (with respect to the base 13) from and to the vehicle 4, thus adjusting the distance from the latter.

According to a preferred explanatory embodiment shown in the accompanying Figures, the calibration devices 6 comprise a target panel 6a suited for the calibration of optical ADAS sensors 3, preferably the cameras of the vehicle 4. According to an embodiment, the target panel 6a can comprise a monitor/display (flat-panel, LCD or OLED or the like) designed, in use, to display, on command, a digital image of a calibration target, which depends on the optical ADAS sensor 3 to be calibrated. The flat ADAS calibration surface of the target panel 6a (shown in FIG. 1) corresponds to the active surface of the monitor/display, which displays the pre-established image of the camera calibration target. According to a further embodiment, the target panel 6a can comprise a rectangular panel, whose flat ADAS calibration surface is used to create (for example, through printing) and/or project (by means of a projector that is not shown herein) the pre-established image of the camera calibration target of the vehicle 4.

In the example shown in FIGS. 1 and 3, a calibration device 6 comprises a radar panel 6b suited for the calibration of ADAS radar sensors. The radar panel 6b is coupled to the support frame 16 so that it can rotate around the axis B. The flat ADAS calibration surface of the radar panel 6b is represented by the active radar refection surface facing the vehicle 4 (shown in FIG. 1).

In use, the rotation of the radar panel 6b around the axis B determines a corresponding change in the angle between the flat ADAS calibration surface of the radar panel 6b and the axis S of the vehicle 4.

The calibration apparatus 2 can further comprise a handling assembly 21 (schematically shown in FIG. 4) designed, on command, to: rotate the support frame 15 around the axis A in order to adjust the angle of the calibration assistance assembly 17 (or of the calibration device 6) relative to the axis S of the vehicle 4, and/or move the support frame 16 along the axis A in order to adjust the height of the calibration assistance assembly 17 (or of the calibration device 6), and/or move the support frame 16 along the axis B (from and to the base 13) in order to adjust the horizontal position of the calibration assistance assembly 17 (or of the calibration device 6), and/or rotate the radar panel 6b around the axis B.

The handling assembly 21 is further designed, on command, to move the support frame 16 along the axis C in order to adjust the distance with respect to the vehicle 4.

The handling assembly 21 can comprise a series of electric devices/motors and/or electric actuators (and/or slides) selectively controlled by the electronic control system 11 so as to carry out the positioning described above.

The electronic control system 11 can conveniently be configured to control the handling assembly 21 based on the determined first position, so as to place the calibration assistance assembly 17 (and/or the calibration device 6) in the pre-established calibration position.

The pre-established calibration position can comprise: a pre-established distance of the calibration apparatus 2 or of a calibration device 6 or of the calibration assistance assembly 7 with respect to the vehicle 4, a pre-established height of a calibration device 6 and/or of the calibration assistance assembly 7 with respect to the vehicle 4 or to the resting plane. The pre-established calibration position can further comprise a pre-established angle (for example, a ninety degree angle) between the axis S of the vehicle 4 and the flat calibration surface of a calibration device 6.

With reference to FIGS. 2A and 2B, the optical apparatuses 8 each comprise a column-shaped container body 22, which extends along an approximately vertical axis U and is arranged so as to rest on the service area 5 adjacent to a relative side of the vehicle 4. At least one image capturing device 23, which is oriented/directed towards the vehicle 4, is arranged in the container body 22.

The container body 22 can have an approximately square or rectangular cross section, transverse to the vertical axis U, and has a preferably flat side or wall 22a, which faces the calibration apparatus 2. In the example shown in FIG. 1, the flat wall 22a approximately lies on a vertical plane, orthogonal to the axis K.

In the example shown herein, the container body 22 comprises an oblong box-shaped body substantially having the shape of a vertical bar or rod. Preferably, in the example shown herein, the container body 22 has not, namely lacks, horizontal protruding arms, which project from the box-shaped body. The Applicant found out that this compact shape reduces the space taken up, increases the sturdiness of the optical apparatus 8 and reduces the exposure of the camera to hits and, hence, to the risk of damages.

The positioning target 9 of the optical apparatus 8 is arranged on a side or flat wall 22a of the container body 22. The positioning target 9 preferably is approximately planar, can comprise a two-dimensional (quadrangular) image representing a pre-established pattern and is rigidly/firmly fixed on the flat wall 22a.

Obviously, according to a possible embodiment (which is not shown herein), the optical apparatus 8 can be provided with two positioning targets 9, one of them being arranged on the side or flat wall 22a (front wall facing the calibration apparatus 2) and the other one being arranged on the opposite flat wall (rear wall opposite the front wall). The Applicant found out that this configuration has, on the one hand, the technical effect of allowing operators to indifferently install each optical apparatus 8 in any position with no need to distinguish it from the others and, on the other hand, has the technical effect of being able to carry out the measurement of the position even when the calibration apparatus 2 is arranged at the back of the vehicle.

Conveniently, the optical apparatuses 8 do no comprise, namely lack, cameras arranged so as to frame the calibration apparatus 2. The flat wall 22a of the container body 22, which has the positioning target 9, is free from cameras facing, directed towards the calibration apparatus 2 in order to frame it. Conveniently, the optical apparatuses 8 do not comprise cameras arranged so as to frame a wheel target, namely a target panel mounted on the wheel, for example the rear wheel of the vehicle. The flat wall of the container body 22 opposite the flat wall 22a on which the positioning target 9 is installed does not comprise, namely lacks, cameras arranged so as to frame a target mounted on the rear wheel of the vehicle.

In the example shown herein, the pattern comprises a geometry containing predetermined graphic elements (squares) in a (black and white) almost chessboard-like arrangement.

With reference to FIG. 2A, the optical image capturing device 23 comprises at least one camera 23a. In the example shown in FIG. 2A, the optical image capturing device 23 further comprises a camera 23b, which is vertically arranged at a pre-established distance under the camera 23a.

According to a possible embodiment, the cameras 23a and 23b cooperate with the electronic control system 11 so as to implement a binocular stereoscopic vision method of the vehicle 4 in order to determine a three-dimensional 3D image of the vehicle 4, or of pre-established parts thereof, based on the images captured by the optical apparatuses 8. The operation of the binocular stereoscopic vision method by means of two cameras in order to construct a three-dimensional image is known and will not be described any further.

The electronic processing system 11 can conveniently be designed to exchange (in a two-way manner) data/images/signals with the optical apparatuses 8 and/or with the electric/electronic devices of the calibration apparatus 2 by means of a wireless communication system (which is not shown herein).

According to a preferred embodiment shown in FIGS. 2A and 2B, the camera 23a and the camera 23b are firmly arranged in the container body 22 so that the relative optical assemblies (lenses) face and are oriented on a common face/side 22b of the container body 22, which is orthogonal to the wall/side 22a, so as to frame a side of the vehicle 4. Preferably, the cameras 23a and 23b can frame the side of the vehicle 4 through openings made in the face/side of the container body 22. The cameras 23a and 23b are arranged in the container body 22 so as to be axially spaced apart from one another along the axis U at a pre-established distance. Preferably, the optical image capturing device 23 can further comprise at least one light source 23c designed to emit a light beam to irradiate the side of the vehicle 4.

According to the preferred embodiment shown in FIGS. 2A and 2B, the camera 23b is arranged in the support column 22 in a lower position. The camera 23a is arranged in the container body 22 in an upper position, immediately under the upper end of the column 22 itself. The light source 23c can vertically be arranged between the two cameras 23a and 23b.

According to a possible embodiment, each optical apparatus 8 can comprise a plate-shaped element 24 (a plate), which is arranged so as to rest on the service area 5 and has, on its upper surface, a reference target 25 (FIG. 2A). The container body 22 can be coupled to the plate-shaped element 24 in a position immediately adjacent to the target 25. The optical image capturing device 23 is arranged in the container body 22 so as to frame and capture, for example by means of the camera 23a, the image of the target 25 present on the plate-shaped element 24 arranged underneath.

The optical apparatuses 8 can advantageously be of the type shown and described in Italian patent application no. 102020000030578 filed by the Applicant, whose content (description and drawings) is completely included herein by way of reference.

According to the embodiment shown in FIGS. 1-4, the electronic control system 11 receives the first images from the optical apparatuses 8 and processes them in order to determine the position of the vehicle 4 in the service area 5 with respect to a pre-established reference system. In FIGS. 1 and 3, the pre-established reference system SR is represented, by mere way of example, by means of a Cartesian system with three axes X, Y and Z orthogonal to one another. In FIGS. 1 and 3, for the sole purpose of improving the comprehension of the invention, the pre-established reference system SR is associated with an optical apparatus 8. The reference system SR can obviously be established by a processing algorithm implemented by the electronic control unit 11.

The electronic control system 11 comprises memory devices (not shown), which contain first items of information indicative of the position of the optical apparatuses 8 with respect to the pre-established reference system SR (and/or reciprocal). Preferably, the detection/determination and the storing of the first items of information indicative of the positions of the optical apparatuses 8 with respect to the pre-established reference system SR can be carried out during an initial adjustment phase. The initial adjustment can entail having the electronic control system 11 process the images of opposite adjustment targets (not shown), which are present on a panel vertically arranged on the central middle line of the service area 5 (axis K) and face the respective optical apparatuses 8. The processing of the images of the adjustment targets captured by the optical apparatuses 8, by the electronic control system 11, determines the position of each optical apparatus 8 with respect to the reference system SR.

According to a possible embodiment, the electronic control system 11 can further determine, through the processing of the first images of the vehicle 4 captured by the optical apparatuses 8 and of the first items of information, second items of information indicative of the position of at least one of the following elements of the vehicle 4 with respect to the pre-established reference system SR: the front axle, the rear axle, the front logo, an ADAS sensor device (camera), a side-view mirror or similar elements. Following the determination of the second items of information concerning the position of one or more elements of the vehicle 4, the electronic control system 11 is capable of determining the position of the vehicle 4 (and/or pre-established vehicle reference element) in the reference system SR, for example based on a series of dimensional data of the vehicle contained, for example, in the memory devices and determined based on items of information identifying the vehicle (model or plate number or the like) given to users, for example, through the interface device 12.

Conveniently, the determination of the second items of information indicative of the position of the vehicle 4 by the electronic control system 11 can be carried out in a static manner, namely by processing the first images in a discontinuous manner, i.e. at predetermined time intervals, or in a dynamic manner, namely by processing the first images in a substantially continuous manner (in real time).

According to a possible embodiment, the electronic control system 11 controls the cameras 10 so as to capture the second images containing the positioning targets 9 and determines, based on the processing of the second images, third items of information, which are indicative of the position of the calibration apparatus 2 and/or of the calibration assistance assembly 17 and/or of a calibration device 6 with respect to the positioning targets 9 of the optical apparatuses 8.

In the example shown in FIGS. 1 and 3, the optical apparatuses 8 are respectively arranged in the area of, namely approximately adjacent to the four wheels of the vehicle 4. Preferably, the positioning targets 9 are arranged on the two opposite optical apparatuses 8, which are adjacent to the front wheels of the vehicle 4, so that they can observed by the cameras 10. Obviously, according to a variant (which is not shown herein), the positioning targets 9 can be arranged, in addition or alternatively, on the two opposite optical apparatuses 8, which are adjacent to the rear wheels of the vehicle 4, so that they can observed by the cameras 10.

The electronic control system 11 is further designed to process the third items of information and the first items of information concerning the position of the optical apparatuses 8 provided with the positioning targets 9 with respect to the pre-established reference system SR, so as to determine fourth items of information indicative of the position of the calibration apparatus 2 and/or of the calibration assistance apparatus 17 and/or of the calibration device 6 with respect to the pre-established reference system SR.

The electronic control system 11 is further designed to process the fourth items of information and the second items of information concerning the position of the vehicle 4 (and/or of a pre-established vehicle reference element) with respect to the pre-established reference system SR, so as to determine fifth items of information, which are indicative of the position of the calibration apparatus 2 and/or of the calibration assistance apparatus 17 and/or of the calibration device 6 with respect to the vehicle 4.

The fifth items of information can comprise: the distance of the calibration apparatus 2 and/or of the calibration assistance assembly 17 and/or of the calibration device 6 with respect to the vehicle 4 (and/or a pre-established vehicle reference element), the height of the calibration assistance assembly 17 and/or of the calibration device 6 with respect to the vehicle 4 (and/or a pre-established vehicle reference element), the angle present between the resting plane of the calibration surface of the calibration device 6 and the axis S of the vehicle 4.

According to a possible embodiment, the electronic control system 11 further is conveniently designed to determine the attitude of the wheels of the vehicle 4 based on the processing of the first images of the vehicle 4 captured by the optical apparatuses 8.

According to a possible embodiment, the electronic control system 11 can further be designed to determined the thrust axis of the vehicle 4 based on the attitude of the wheels of the rear axle, wherein the attitude is determined through the processing of the first images.

According to a possible embodiment, the electronic control system 11 can further determine (instant by instant), based on the fifth items of information, the difference/deviation between the position of the calibration apparatus 2 with respect to the vehicle 4 and the pre-established calibration position (stored) in the memory means (which are not shown herein).

The electronic control system 11 can provide movement control signals/data indicative of the movement to be made by the calibration apparatus 2 and/or by the calibration assistance assembly 17 and/or by the calibration device 6 with respect to the vehicle 4 (and/or a pre-established vehicle reference element) based on the difference/deviation, so as to reduce it/cause it to become zero in order to reach the pre-established calibration position.

According to a possible embodiment, the electronic control system 11 can provide the user interface device 12 with the movement control signals. The user interface device 12 can be configured to implement algorithms that process the movement control signals and transform/convert them into visual/visible guide signals/data (which can be observed by operators) and/or sound guide signals/data (intermittent messages or sounds). Said guide signals/data can be programmed so as to guide/assist operators in placing and/or adjusting the position of the calibration apparatus 2 and/or of the calibration assistance apparatus 17 and/or of the calibration device 6 with respect to the vehicle 4 in the pre-established calibration position.

The electronic control system 11 is further configured to provide the handling assembly 21 with the movement control signals in order to automatically control the movement of the calibration apparatus 2 and/or of the calibration assistance assembly 17 and/or of the calibration device 6 with respect to the vehicle 4 based on the difference/deviation, so as to reduce it/cause it to become zero in order to reach the pre-established calibration position.

In this way, the system 1 conveniently is able to adjust/tune, in a completely automatic manner and with a high precision, the position of the calibration apparatus 2 and/or of the calibration assistance assembly 17 and/or of the calibration device 6 with respect to the vehicle 4, so as to cause it to reach the pre-established calibration position.

The operating method of the vehicle service system 1 described above basically entails placing the calibration apparatus 2 in the service area 5 (FIGS. 1 and 3), for example in front of the vehicle 4; placing (if they are not already present) the optical apparatuses 8 in the relative positions in the service area 5, so that the relative positioning targets 9 are oriented towards and can be observed by the cameras 10 of the calibration apparatus 2.

Obviously, the vehicle service system 1 can entail the calibration step mentioned above, to which the optical apparatuses 8 are subjected in order to determine and store the first items of information indicative of the position thereof with respect to the reference system SR. Conveniently, the optical apparatuses 8 can be removed/separated from the plate-shaped elements 24 and mounted again in the same positions associated with the first items of information stored, whereas the targets 25, during the separation, can conveniently remain firmly anchored on the surface of the service area 5 by means of the plate-shaped elements 24. The images of the targets 25 captured by the optical apparatuses 8 and processed by the electronic control system 11 following the re-installation of the column container bodies 22 allow the optical apparatuses 8 to be re-calibrated each time (without repeating the initial adjustment) in order to determine and/or correct the first items of information indicative of the actual positions of the optical apparatuses 8 with respect to the reference system SR. In other words, the processed images of the targets 25 allow the system to implement a self-zero algorithm, which determines, with utmost precision and with every installation of the optical apparatuses 8, the position thereof with respect to the reference system SR.

The operating method of the vehicle service system 1 further comprises the step of determining second items of information indicative of the position of the vehicle 4 with respect to the reference system SR based on the processing of the first images of the vehicle (images of the opposite sides) captured by the optical apparatuses 8 and on the first items of information.

The operating method of the vehicle service system 1 further comprises the step of determining third items of information indicative of the position of the calibration apparatus 2 and/or of the calibration assistance assembly 17 and/or of the calibration device 6 with respect to the optical apparatuses 8 (targets 9) based on the processing of the second images containing the positioning targets 9 captured by the cameras 10.

The operating method of the vehicle service system 1 further comprises the step of determining fourth items of information indicative of the position of the calibration apparatus 2 and/or of the calibration assistance assembly 17 and/or of the calibration device 6 with respect to the reference system SR based on the processing of the third and first items of information.

The operating method of the vehicle service system 1 further comprises the step of determining fifth items of information indicative of the position of the calibration apparatus 2 and/or of the calibration assistance assembly 17 and/or of the target devices 6 with respect to the vehicle 4 (and/or to the pre-established vehicle reference element) based on the fourth items of information and on the second items of information.

The operating method of the vehicle service system 1 further can conveniently comprise the step of determining the deviation/difference between the pre-established calibration position of the calibration apparatus 2 and the determined position/orientation of the calibration apparatus 2 and/or of the calibration assistance assembly 17 and/or of the calibration device 6.

The operating method of the vehicle service system 1 further can conveniently comprise the step of guiding operators through the interface device 12 based on the deviation/difference between the pre-established calibration position of the calibration apparatus 2 and the determined position/orientation of the calibration apparatus 2 and/or of the calibration assistance assembly 17 and/or of the calibration device 6. The interface device 12 can guide operators in a controlled manner based on the aforesaid determined position/orientation so as to cause the aforesaid deviation/difference to become zero.

The operating method of the vehicle service system 1 further can conveniently comprise the step of automatically controlling the handling assembly 21 based on the deviation/difference between the pre-established calibration position of the calibration apparatus 2 and the determined position/orientation of the calibration apparatus 2 and/or of the calibration assistance assembly 17 and/or of the calibration device 6.

The handling assembly 21 can be controlled by the electronic control system 11 based on the determined position/orientation so as to cause the aforesaid deviation/difference to become zero. The handling assembly 21 can move, in response to the control signal provided by the electronic control system 11, in a selective and/or alternative manner: the calibration assistance assembly 17 and/or the calibration device 6 around the axis A and/or along the axis B and/or around the axis B and/or along the axis C until it reaches the relative calibration position.

The Applicant found out that the use of the cameras 10 (firmly) mounted on the calibration apparatus 2 to observe/capture the positioning targets 9 mounted, in turn, on the optical apparatuses 8, in order to determine the mutual position of the calibration apparatus and of the vehicle, leads to different advantages.

First of all, the overall costs of the vehicle service system can be reduced, especially when operators have to carry out the calibration of a plurality of vehicles arranged in different service areas by means of one single calibration apparatus. In this case, the system guides the positioning of the calibration apparatus in the areas with the aid of two sole cameras 10, exploiting the positioning targets mounted on the optical apparatuses present in the areas. The Applicant found out that a different configuration from the one described above, entailing—for example—installing two positioning targets on the calibration apparatus and observing the positioning targets by means of the cameras mounted on the optical apparatuses, significantly increases the cost of the positioning system compared to the solution disclosed herein.

This technical problem affects, for example, the system described in EP 3 629 053 A1. In particular, in case a workshop uses one single calibration apparatus to carry out the calibration of a series of vehicles arranged in a plurality of service areas provided with respective pairs of optical devices, the system requires the use of as many pairs of association cameras. For example, in case in the workshop there are four service areas and eight optical devices, the system described in EP 3 629 053 A1 requires the use of eight association cameras.

Therefore, the technical effect obtained by the invention thanks to the positioning of the targets on the optical apparatuses and to the installation of the two cameras on the calibration apparatus is that of conveniently using only two cameras in case of a series of service areas, so as to reduce costs.

The Applicant further found out that the installation of the cameras on the calibration apparatus reduces the risk of damaging thereof. As a matter of fact, the cameras mounted on the optical apparatuses are exposed to hits by operators and, as a consequence, are subjected to damaging.

The Applicant further found out that the use of the two cameras mounted on the calibration apparatus in front of the vehicle allows, in the configuration with four optical apparatuses and four targets, the measuring precision to be improved. In this case, indeed, the two cameras capture four images of targets associated with as many points that the system can process in order to determine the additional items of information on the position.

Furthermore, the Applicant found out that the combined use of the targets arranged on the plate-shaped elements and of the positioning targets obtained on the support columns increases the measuring precision, since the targets define two references, which are conveniently used by system each time, for example with each new placing of the optical apparatus in the service are, in order to carry out a re-calibration so as to correct position errors (self-zero).

Moreover, the system is conveniently simplified, besides being more precise, compared to those system that involve the use of reference targets mounted on the wheels. In these systems, indeed, an incorrect positioning of the target on the wheel leads to errors in the measurement of the position.

Finally, the use of the optical apparatuses operating in a stereoscopic manner allows the service system to be used both to carry out the calibration of the ADAS sensors and to determine the attitude of the wheels of the vehicle and, if necessary, to automatically correct the error caused in the positioning of the calibration apparatus and/or of the calibration device and/or of the calibration assistance assembly also based on the actual attitude.

Finally, it is clear that the system and the method described above can be subjected to changes and variants, without for this reason going beyond the scope of protection of the invention.

Figure 5:
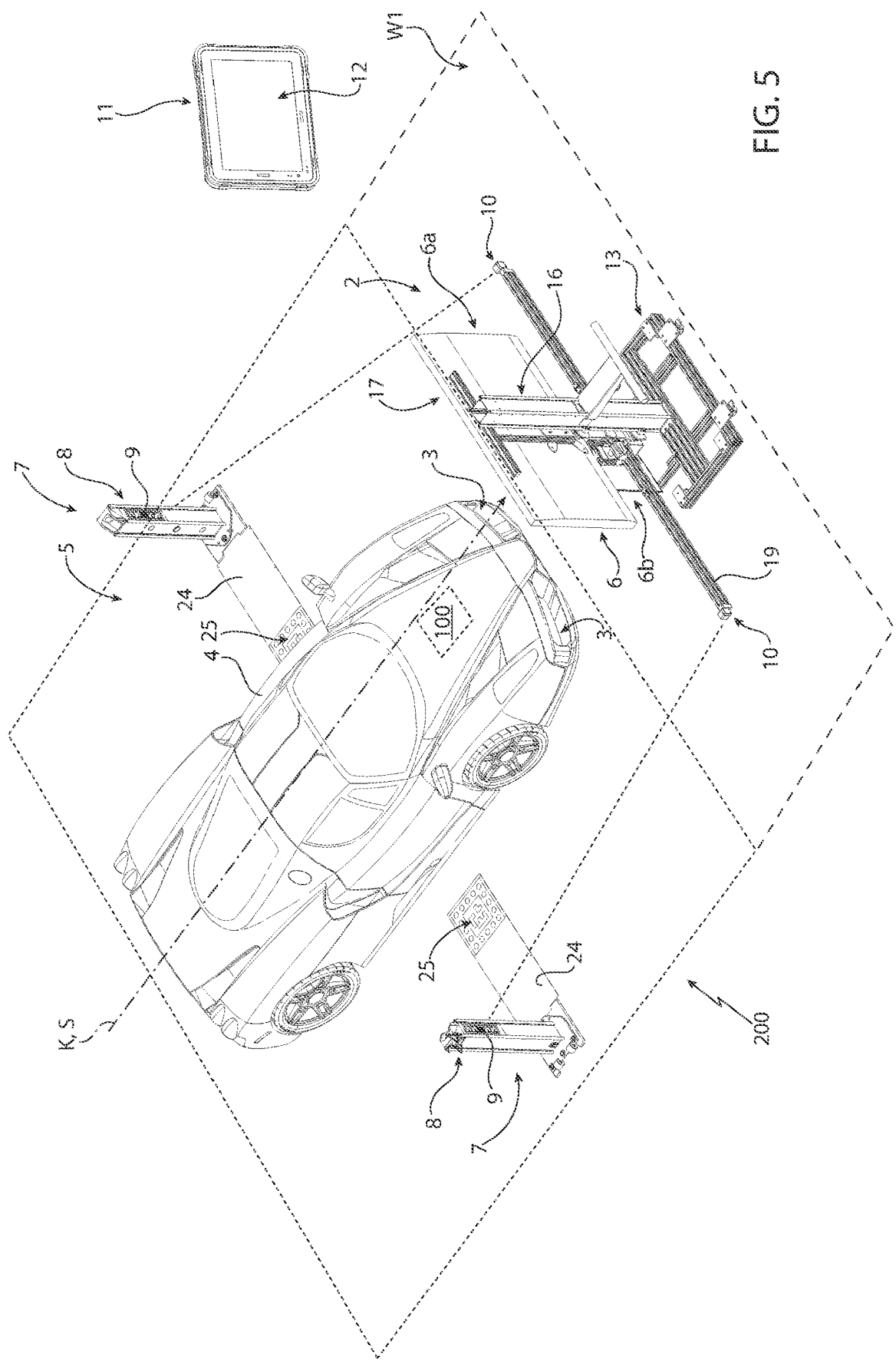
FIG. 5 is a schematic perspective view of a vehicle service system according to a variant of the invention.

The embodiment shown in FIG. 5 relates to a vehicle service system 200, which is similar to the vehicle service system 1 shown in FIGS. 1 and 3 and whose components are identified, when possible, with the same reference numbers as the ones indicating corresponding parts of the vehicle service system 1. The difference between the vehicle service system 200 and the vehicle service system 1 lies in that the position detection system, instead of comprising four optical apparatuses 8, comprises two optical apparatuses 8 aligned with and opposite one another in respective intermediate axial positions of the vehicle 4 transverse to the axis S.

The invention claimed is:

1. A vehicle service system (1)(200) comprising:
a calibration apparatus (2), which is designed to calibrate at least one advanced driver assistance systems sensor (3) comprised in an advanced driver assistance system (100) of a vehicle (4) arranged in a vehicle service area (5), said calibration apparatus (2) is designed to move on a resting plane adjacent to said vehicle service area (5) and comprises at least a calibration device (6), which is designed to be detected by said advanced driver assistance systems sensor (3) during the calibration of the advanced driver assistance systems sensor (3) itself,
said vehicle service system is characterised in that it comprises a position detection system (7) comprising:
at least two optical apparatuses (8), which are arranged in the vehicle service area (5) on opposite sides of said vehicle (4) one with respect to the other, and are configured to capture first images containing images of the vehicle (4), said optical apparatuses (8) have respective positioning targets (9) which are orientated in order to be facing said calibration apparatus (2),
two cameras (10) which are mounted on said calibration apparatus (2) so as to be arranged in lateral positions, on opposite sides with respect to said calibration device (6); the two cameras (10) are optically orientated towards said optical apparatuses (8) to capture second images which contain said positioning targets (9) of said optical apparatuses (8), and
an electronic processing system (11) which is configured so as to determine a first position indicative of the position of said calibration apparatus (2) and/or of the position of said calibration device (6) with respect to said vehicle (4), based on said first images and said second images,
wherein said electronic processing system (11) is configured to automatically control the movement of the calibration apparatus (2) and/or the movement of said calibration device (6) in a pre-established calibration position based on said first position.

2. Vehicle service system according to claim 1, wherein said electronic processing system (11) is configured to provide a user, by interface means (12), with information for assisting/driving the movement of said calibration apparatus (2) and/or the movement of said calibration device (6) in a pre-established calibration position based on said first position.

3. Vehicle service system according to claim 1, wherein said calibration apparatus (2) comprises:
a moveable base (13) designed to move on said resting plane,
at least one support structure (16) which is mounted on said base (13) and supports said calibration device (6) and the two cameras (10),
a handling assembly (21) designed to selectively move said support structure (16) and/or said calibration device (6) with respect to said base (13): at least along a first axis to vary its distance with respect to said vehicle (4), and/or along a second axis to vary its height with respect to said resting plane, and/or around a third axis to vary its angle with respect to the axis of symmetry or the axis of thrust of said vehicle (4).

4. Vehicle service system according to claim 3, wherein said support structure (16), said at least one calibration device (6) and said cameras (10) form a calibration assistance assembly (17),
said electronic processing system (11) is configured in order to control said handling assembly (21) in order to automatically place the calibration assistance assembly (17) and/or the calibration device (6) in a pre-established calibration position based on said determined first position.

5. Vehicle service system according to claim 1, wherein said optical apparatuses (8) each comprise an elongated shaped column container (22) which extends vertically and has at least one flat lateral surface portion (22*a*) which faces said calibration apparatus (2) so as to be viewed by a respective camera (10); said reference target (9) being firmly fixed on said flat lateral surface portion (22*a*) of the column container (22).

6. Vehicle service system according to claim 5, wherein said container body (22) comprises an oblong box-shaped body substantially shaped like a vertical bar or rod; said container body (22) does not comprise horizontal protruding arms, which project from the box-shaped body.

7. Vehicle service system according to claim 6, wherein said optical apparatuses (8) comprise at least two cameras (23*a*)(23*b*) operating in a stereoscopic manner, which are vertically arranged on top of one another in said column container (22); said electronic control means (11) are configured so as to implement a binocular stereoscopic vision method of the vehicle (4) so as to determine a three-dimensional 3D image of the vehicle (4) based on the images captured by the optical apparatuses (8).

8. Vehicle service system according to claim 1, comprising four optical devices (8), which are arranged adjacent to the four wheels of said vehicle (4), respectively; said positioning targets (9) are arranged on at least two opposite optical apparatuses (8), which are adjacent to the front wheels of the vehicle (4) in order to be observed by said cameras (10).

9. Vehicle service system according to claim 8, wherein said positioning targets (9) are arranged on the two opposite optical apparatuses (8), which are adjacent to the rear wheels of the vehicle (4) in order to be observed by the cameras (10).

10. Vehicle service system according to claim 1, wherein said electronic processing system (11) is configured in order to determine the attitude of the wheels of the vehicle (4) based on the processing of the first images of the vehicle (4) captured by said optical apparatuses (8).

11. The service system according to claim 5, wherein said optical apparatus (8) comprises an image capturing device (23) and a plate-shaped element (24) which is arranged so as to rest on the service area (5) and has, on the upper surface, a reference target (25); said column container (22) is coupled to the plate-shaped element (24) in a position immediately adjacent to said reference target (25); said optical image capturing device (23) is designed to frame the image of the reference target (25) present on said plate-lake element (24) arranged underneath.

12. The service system according to claim 1, wherein said optical apparatuses (8) do not comprise cameras arranged so as to frame said calibration apparatus (2).

13. The service system according to claim 1, wherein said optical apparatuses (8) do not comprise cameras arranged so as to frame a wheel target mounted on the rear wheel of the vehicle.

14. An operating method of a vehicle service system (1) comprising:

a calibration apparatus (2), which is designed to calibrate at least one advanced driver assistance systems sensor (3) comprised in an advanced driver assistance system (100) of a vehicle (4) arranged in a vehicle service area (5), said calibration apparatus (2) is designed to move on a resting plane adjacent to said vehicle service area (5) and comprises at least one calibration device (6), which is designed to be detected by said advanced drive assistance systems sensor (3) to facilitate the calibration of the same, said method is characterised in that it comprises the steps of:

arranging at least two optical apparatuses (8) in the vehicle service area (5) on opposite sides of said vehicle (4) one with respect to the other, so that they are configured to capture first images containing images of the vehicle, said optical apparatuses (8) have respective positioning targets (9) orientated so as to be facing said calibration apparatus (2), arranging two cameras (10) on said calibration apparatus (2) in lateral positions, on opposite sides with respect to said calibration device (6); the two cameras (10) are optically orientated towards said optical apparatuses (8) to capture second images which contain said positioning targets (9) of said optical apparatuses (8), determining, by an electronic processing system (11), a first position indicative of the position of said calibration apparatus (2) and/or of the position of said calibration device (6) with respect to said vehicle (4), based on said first images and second images, and automatically controlling, by the electronic processing system (11), the movement of said calibration apparatus (2) and/or the handling of said calibration device (6) in a pre-established calibration position based on said first position.

15. A vehicle service system (1)(200) comprising:

a calibration apparatus (2), which is designed to calibrate at least one advanced driver assistance systems sensor (3) comprised in an advanced driver assistance system (100) of a vehicle (4) arranged in a vehicle service area (5), said calibration apparatus (2) is designed to move on a resting plane adjacent to said vehicle service area (5) and comprises at least a calibration device (6), which is designed to be detected by said advanced driver assistance systems sensor (3) during the calibration of the advanced driver assistance systems sensor (3) itself, said vehicle service system is characterised in that it comprises a position detection system (7) comprising:

at least two optical apparatuses (8), which are arranged in the vehicle service area (5) on opposite sides of said vehicle (4) one with respect to the other, and are configured to capture first images containing images of the vehicle (4), said optical apparatuses (8) have respective positioning targets (9) which are orientated in order to be facing said calibration apparatus (2), two cameras (10) which are mounted on said calibration apparatus (2) so as to be arranged in lateral positions, on opposite sides with respect to said calibration device (6); the two cameras (10) are optically orientated towards said optical apparatuses (8) to capture second images which contain said positioning targets (9) of said optical apparatuses (8), and an electronic processing system (11) which is configured so as to determine a first position indicative of the position of said calibration apparatus (2) and/or of the position of said calibration device (6) with respect to said vehicle (4), based on said first images and said second images, wherein said electronic processing system (11) is configured to provide a user, by interface means (12), with information for assisting/driving the movement of said calibration apparatus (2) and/or the movement of said calibration device (6) in a pre-established calibration position based on said first position.

* * * * *